United States Patent
Hamada (10) Patent No.: US 9,692,918 B2
(45) Date of Patent: Jun. 27, 2017

(54) DEVICE CONTROL SYSTEM AND DEVICE CONTROL METHOD FOR MANAGING REMOTE CONFERENCE

(71) Applicant: Noriaki Hamada, Kanagawa (JP)

(72) Inventor: Noriaki Hamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/802,157

(22) Filed: Jul. 17, 2015

(65) Prior Publication Data
US 2016/0044187 A1    Feb. 11, 2016

(30) Foreign Application Priority Data
Aug. 6, 2014  (JP) ................................ 2014-160564

(51) Int. Cl.
| | |
|---|---|
| *G06F 3/12* | (2006.01) |
| *H04N 1/00* | (2006.01) |
| *G06K 9/00* | (2006.01) |
| *G06K 9/20* | (2006.01) |

(52) U.S. Cl.
CPC ..... *H04N 1/00336* (2013.01); *G06K 9/00624* (2013.01); *G06K 9/2063* (2013.01); *H04N 1/00244* (2013.01); *H04N 1/00251* (2013.01)

(58) Field of Classification Search
None
See application file for complete search history.

(56) References Cited

U.S. PATENT DOCUMENTS

| | | | | |
|---|---|---|---|---|
| 8,294,937 B2 * | 10/2012 | Wakui | ................... | G06F 3/1219 358/1.1 |
| 2005/0071430 A1 * | 3/2005 | Kobayashi | ............... | H04N 7/15 709/205 |
| 2005/0128519 A1 * | 6/2005 | Yamauchi | .......... | H04N 1/00209 358/1.15 |
| 2006/0055807 A1 * | 3/2006 | Pemer | ................ | H04N 5/23238 348/333.11 |

(Continued)

FOREIGN PATENT DOCUMENTS

| | | |
|---|---|---|
| JP | 2004-086033 | 3/2004 |
| JP | 2006-201865 | 8/2006 |

*Primary Examiner* — John Wallace
(74) *Attorney, Agent, or Firm* — Oblon, McClelland, Maier & Neustadt, L.L.P.

(57) ABSTRACT

A device management system includes a device-information acquiring unit to acquire, from each of devices, device information including address information and acquisition source information; a first image acquiring unit to acquire an image that is obtained by capturing a space where any of the devices is provided; a recognizing unit to recognize the device from the image; and an associating unit to associate the recognized device with device information about the recognized device on the image. An information processing device includes a second image acquiring unit to acquire an image with which the device information is associated; a control-program acquiring unit to acquire a control program of the recognized device on the basis of the acquisition source information; and a device control unit to control the recognized device on the basis of the control program and the address information associated with the image acquired by the second image acquiring unit.

8 Claims, 10 Drawing Sheets

(56) References Cited

U.S. PATENT DOCUMENTS

| | | | |
|---|---|---|---|
| 2014/0077937 A1* | 3/2014 | Kato | H04B 5/0062 340/10.42 |
| 2014/0118239 A1* | 5/2014 | Phillips | G06F 9/4445 345/156 |

* cited by examiner

```
<HTML>
<BODY>
<img src="image information.jpg" width="500" height="250" usemap="#Map" border="0">

<MAP name="Map">
</MAP>
</BODY>
</HTML>
```

FIG.5

```
<HTML>
<BODY>
<img src="image information.jpg" width="500" height="250" usemap="#Map" border="0">

<MAP name="Map">
   <area shape="rect" coords="50,80,100,100" href="device A">
   <area shape="rect" coords="370,100,450,151" href="device B">
</MAP>
</BODY>
</HTML>
```

DEVICE CONTROL SYSTEM AND DEVICE CONTROL METHOD FOR MANAGING REMOTE CONFERENCE

CROSS-REFERENCE TO RELATED APPLICATIONS

The present application claims priority to and incorporates by reference the entire contents of Japanese Patent Application No. 2014-160564 filed in Japan on Aug. 6, 2014.

BACKGROUND OF THE INVENTION

1. Field of the Invention

The present invention relates to a device control system and a device control method.

2. Description of the Related Art

There is a conventionally-known technology for generating the floor map that indicates the location of a device on the floor (see, for example, Japanese Patent Application Laid-open No. 2006-201865).

For example, a user sees the generated floor map to know the installation location of a printing device that is to be used by himself/herself, the device name, and the Uniform Resource Locator (URL) of the source from which the printer driver program of the printing device is downloaded. Then, the user uses the known device name or URL to download the printer driver program of the printing device, installs it in a personal computer (PC), and uses the PC with the printer driver program installed therein to conduct printing using the printing device that is provided in the known installation location.

However, if the location of the device is changed after the floor map is generated, the location of the device on the floor map is different from the actual location of the device on the floor; therefore, even if a user sees the floor map, he/she cannot know the information on the device that is actually used by himself/herself.

DETAILED DESCRIPTION OF THE PREFERRED EMBODIMENTS

According to an embodiment, a device control system includes a device management system and an information processing device. The device management system includes a device-information acquiring unit, a first image acquiring unit, a recognizing unit, and an associating unit. The device-information acquiring unit acquires, from each of a plurality of devices that are connected to the device management system via a network, device information that includes at least address information indicating an address of the device on the network and acquisition source information indicating a source from which a control program for controlling the device is acquired. The first image acquiring unit acquires an image that is obtained by capturing a space where any of the devices is provided. The recognizing unit recognizes the device from the image acquired by the first image acquiring unit. The associating unit associates the recognized device with device information about the recognized device on the image acquired by the first image acquiring unit. The information processing device includes a second image acquiring unit, a control-program acquiring unit, and a device control unit. The second image acquiring unit acquires an image with which the device information is associated. The control-program acquiring unit acquires a control program of the recognized device via the network on the basis of the acquisition source information included in the device information that is associated with the image acquired by the second image acquiring unit. The device control unit controls the recognized device via the network on the basis of the control program and the address information included in the device information that is associated with the image acquired by the second image acquiring unit.

An embodiment of a device control system and a device control method will be described below in detail with reference to the accompanying drawings.

Figure 1:
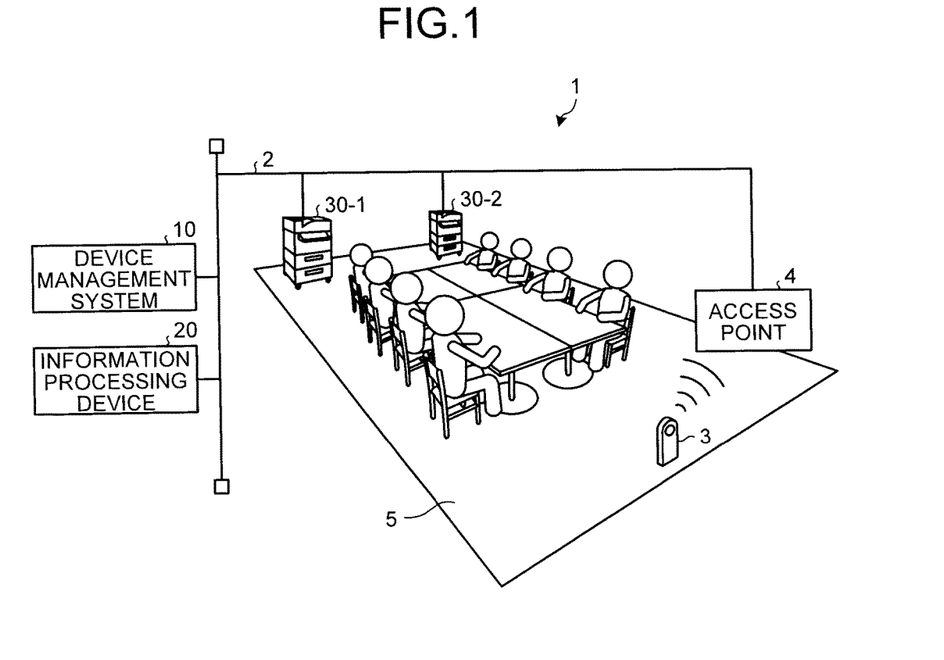
FIG. 1 is a block diagram that illustrates an example of the configuration of a device control system according to the present embodiment.

FIG. 1 is a block diagram that illustrates an example of the configuration of a device control system 1 according to the present embodiment. As illustrated in FIG. 1, the device control system 1 includes a capturing device 3, an access point 4, a device management system 10, an information processing device 20, and devices 30-1 and 30-2.

The capturing device 3, the access point 4, and the devices 30-1 and 30-2 are provided in a conference room 5 (an example of a space), and the device management system 10 and the information processing device 20 are provided in a space that is different from the conference room 5. According to the present embodiment, an explanation is given of the conference room as an example of a space; however, the embodiment is not limited thereto, and it is acceptable to use a rental office, an event site, or the like.

The access point 4, the device management system 10, the information processing device 20, and the devices 30-1 and 30-2 are connected via a network 2. The network 2 can be implemented by using, for example, the Internet or a local area network (LAN).

In the following explanation, if the devices 30-1 and 30-2 do not need to be discriminated from each other, they are sometimes simply referred to as a device 30.

The capturing device 3 captures the inside of the conference room 5. Here, the capturing device 3 needs to capture the devices 30-1 and 30-2, which are provided in the conference room 5, and all the people who are present in the conference room 5. In consideration of this capturing condition, it is preferable that the capturing device 3 uses a full spherical camera that is capable of capturing a spherical image in all directions (360 degrees) around itself; however, the embodiment is not limited thereto. For example, it is acceptable to use a digital camera, or the like, that is provided to capture the devices 30-1 and 30-2, which are provided in the conference room 5, and all the people who are present in the conference room 5.

The access point 4 is a wireless device for wirelessly connecting the capturing device 3 to the network 2.

The device management system 10 manages the device 30 and includes, for example, one or more computers, and such computers can be used as one or more device management apparatuses. The device management system 10 actually manages devices that are not illustrated in FIG. 1 other than the device 30.

The information processing device 20 controls the device 30 and includes, for example, a personal computer (PC), a smartphone, or a tablet-type terminal.

The device 30 includes, for example, image forming devices, such as a printing device, a copier, a multifunction peripheral, a scanner device, or a facsimile machine, or various electronic devices, such as a projector, a camera, an air conditioner, a refrigerator, a fluorescent lamp, an automatic vending machine, or a hand-held terminal. In the present embodiment, an explanation is given of, for example, the case where the device 30 is an image forming device; however, the embodiment is not limited thereto.

Figure 2:
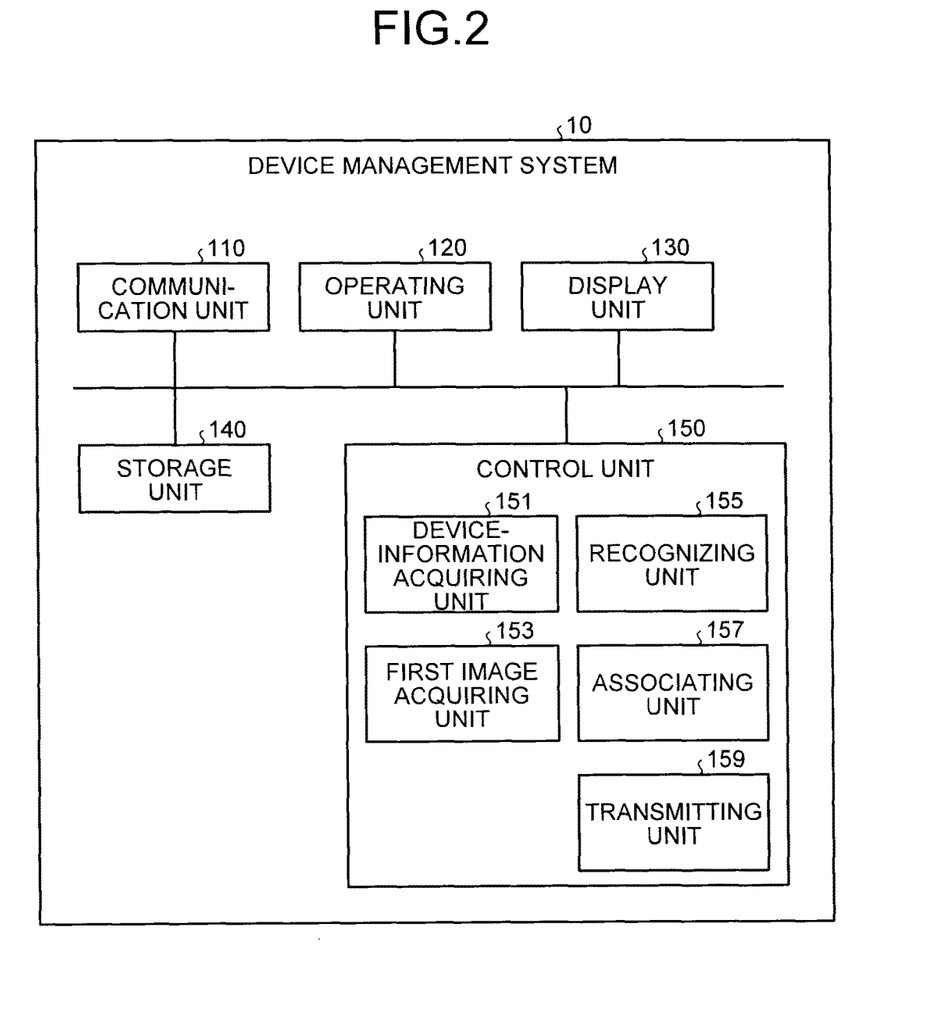
FIG. 2 is a block diagram that illustrates an example of the configuration of a device management system according to the present embodiment.

FIG. 2 is a block diagram that illustrates an example of the configuration of the device management system 10 according to the present embodiment. As illustrated in FIG. 2, the device management system 10 includes a communication unit 110, an operating unit 120, a display unit 130, a storage unit 140, and a control unit 150.

The communication unit 110 communicates with an external device, such as the access point 4, the information processing device 20, or the device 30, via the network 2, and it can be implemented by using a network interface card (NIC), or the like.

The operating unit 120 receives various operation inputs and can be implemented by using an input device, such as a keyboard, a mouse, a touch-pad, or a touch panel.

The display unit 130 displays various screens and can be implemented by using a display device, such as a liquid crystal display or a touch panel display.

The storage unit 140 stores therein various programs that are executed by the device management system 10 and data that is used during various operations performed by the device management system 10. The storage unit 140 can be implemented by using at least any one of storage devices, such as a hard disk drive (HDD), a solid state drive (SSD), a memory card, an optical disk, a read only memory (ROM), and a random access memory (RAM), that enable magnetical, optical, or electrical storage.

The control unit 150 controls each unit of the device management system 10 and can be implemented by using a control device, such as a central processing unit (CPU). The control unit 150 includes a device-information acquiring unit 151, a first image acquiring unit 153, a recognizing unit 155, an associating unit 157, and a transmitting unit 159.

The device-information acquiring unit 151 acquires, from each of the devices 30 that are connected via the network 2, the device information that includes at least the address information indicating the address of the device 30 on the network 2 and the acquisition source information indicating the source from which the control program for controlling the device 30 is acquired. In the present embodiment, the device information includes the address information, the acquisition source information, and the device identification information for identifying a device; however, the embodiment is not limited thereto.

The address information includes, for example, the IP address. The acquisition source information includes, for example, the Uniform Resource Locator (URL) of the source from which the control program for controlling the device 30 is downloaded. In the present embodiment, as the device 30 is an image forming device, an explanation is given of, for example, a case where the control program is a printer driver program; however, the embodiment is not limited thereto. The device identification information includes, for example, the device name (serial number).

The device-information acquiring unit 151 actually acquires the device information from a device that is managed by the device management system 10 and that is not illustrated in FIG. 1 other than the device 30.

The first image acquiring unit 153 acquires an image that is obtained by capturing the room where any of the devices managed by the device management system 10 is provided. In the present embodiment, an explanation is given of, for example, a case where the first image acquiring unit 153 gives a capturing command to the capturing device 3 via the access point 4 and acquires, from the capturing device 3 via the access point 4, an image that is obtained by capturing the conference room 5 where the devices 30-1 and 30-2 are provided; however, the embodiment is not limited thereto.

Figure 3:
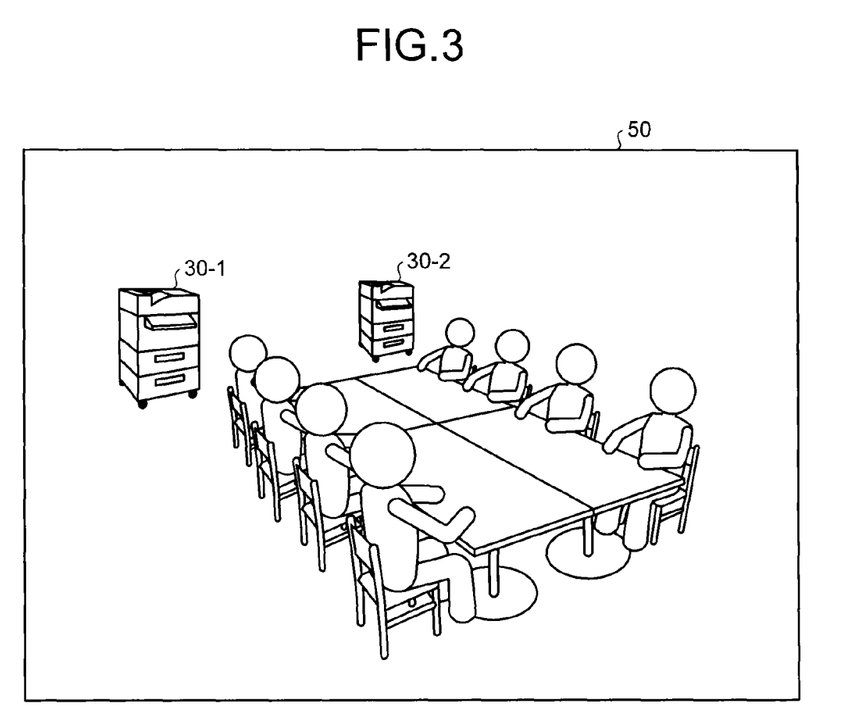
FIG. 3 is a diagram that illustrates an example of an image according to the present embodiment.
Figure 4:
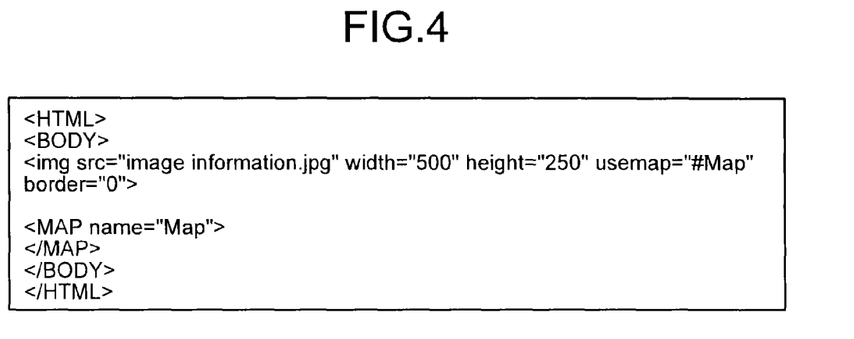
FIG. 4 is a diagram that illustrates an example of HTML-format information of the image that is illustrated in FIG. 3.

FIG. 3 is a diagram that illustrates an example of an image 50 according to the present embodiment. As illustrated in FIG. 3, the image 50 is obtained by capturing the inside of the conference room 5 illustrated in FIG. 1, and it includes the devices 30-1 and 30-2 and conference participants. In actuality, the first image acquiring unit 153 acquires the image illustrated in FIG. 3 as the HyperText Markup Language (HTML)-format information illustrated in FIG. 4.

The recognizing unit 155 recognizes the device 30 from the image that is acquired by the first image acquiring unit 153. For example, in the present embodiment, the device 30 is provided with code information that is obtained by coding the device identification information on the device 30. Therefore, the recognizing unit 155 extracts the code information from the image acquired by the first image acquiring unit 153 and uses the device identification information based on the code information to recognize the device 30 from the image.

In recognizing the device 30 from the image 50 illustrated in FIG. 3, the recognizing unit 155 uses the above-described technique to recognize, from the image 50, the device name of the device 30-1 and the positional coordinates on the image 50 and also recognize the device name of the device 30-2 and the positional coordinates on the image 50. The device name of the device 30 can be recognized by using the device identification information that is obtained by decoding the extracted code information. Furthermore, the positional coordinates on the image 50 in the extracted code information may be recognized as the positional coordinates of the device 30 on the image 50.

The technique for recognizing the device 30 from the image acquired by the first image acquiring unit 153 is not limited to the above-described technique and, for example, the device 30 may be recognized from the image by recognizing the feature points of the device 30 that appears on the image.

The recognizing unit 155 further recognizes the number of people that are present in the room from the image acquired by the first image acquiring unit 153. In recognizing the number of people from the image 50 illustrated in FIG. 3, the recognizing unit 155 uses the existing human recognition technique to recognize that the number of conference participants present in the conference room 5 is eight.

The associating unit 157 associates the device 30 recognized by the recognizing unit 155 with the device information about the device 30 on the image acquired by the first image acquiring unit 153. Specifically, on the image, the associating unit 157 associates the device 30 with, as the device information on the recognized device 30, the device information that includes the device identification information based on the code information recognized by the recognizing unit 155 out of the device information acquired by the device-information acquiring unit 151.

In the present embodiment, the associating unit 157 uses the HTML-format information to associate the device 30 recognized by the recognizing unit 155 with the device information about the device 30 on the image.

Figure 5:
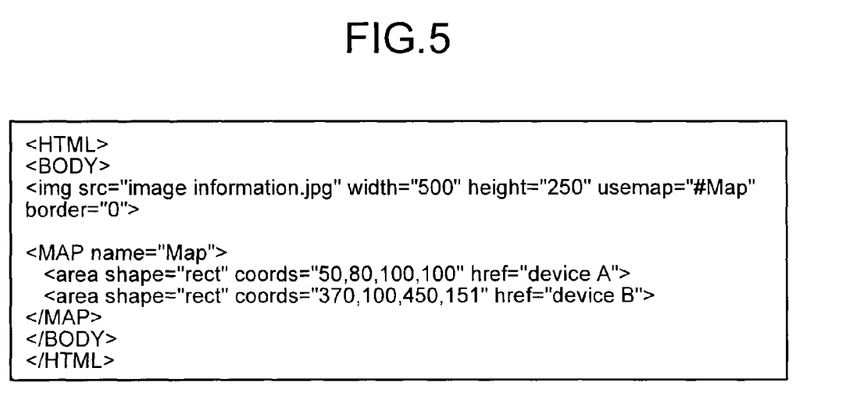
FIG. 5 is a diagram that illustrates an example of the HTML-format information after device information is associated with the image that is illustrated in FIG. 3.

FIG. 5 is a diagram that illustrates an example of the HTML-format information after the device 30 is associated with the device information about the device 30 on the image 50. In FIG. 5, the information, such as "area shape", "coords", and "href", is added to the HTML-format information illustrated in FIG. 4. "area shape" is the information that indicates the shape of the area where the device 30 is present, and "rect" indicates a rectangular area. "coords" indicates the x- and y-coordinates of the upper left of the area where the device 30 is present and the x- and y-coordinates of the lower right of the area. "area shape", and "coords" correspond to the positional coordinates of the device 30 recognized by the recognizing unit 155. "href" is the information on the link destination, "device A" corresponds to the acquisition source information included in the device information on the device 30-1, and "device B" corresponds to the acquisition source information included in the device information on the device 30-2. In the example illustrated in FIG. 5, an explanation is omitted for the information that corresponds to the address information; however, actually, the information that corresponds to the address information is also associated.

The transmitting unit 159 transmits, to the information processing device 20, the image with which the device information is associated by the associating unit 157 and the number-of-people information that indicates the number of people recognized by the recognizing unit 155.

Figure 6:
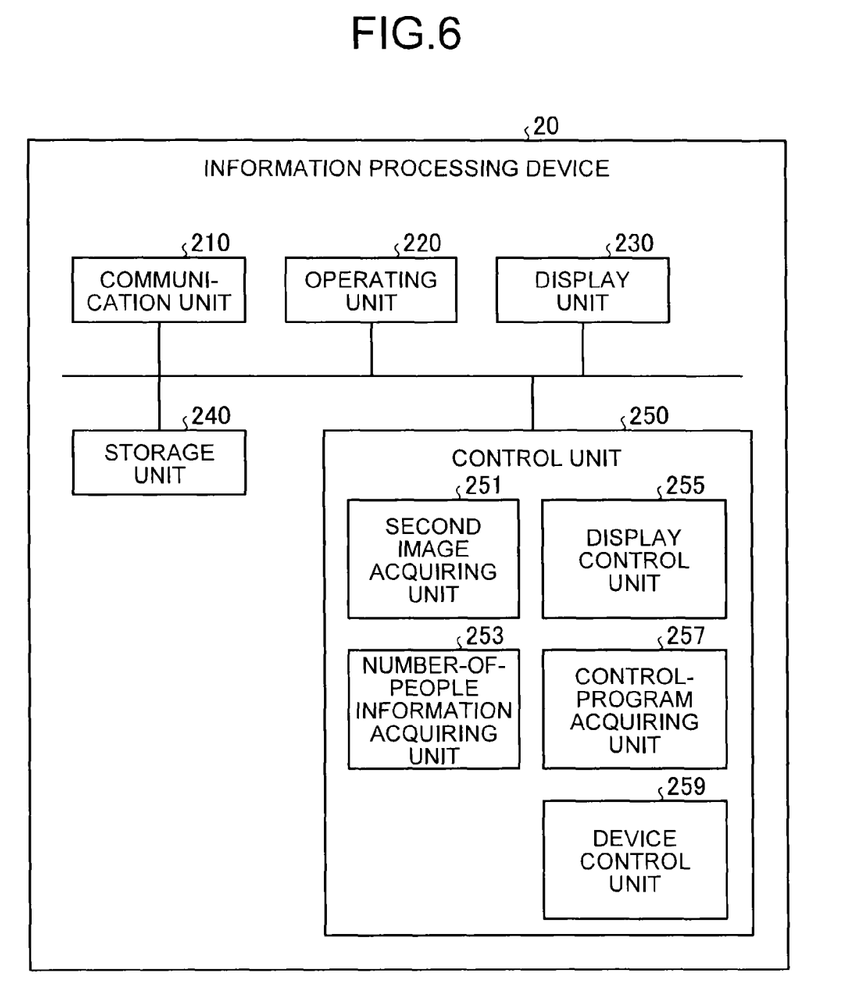
FIG. 6 is a block diagram that illustrates an example of the configuration of an information processing device according to the present embodiment.

FIG. 6 is a block diagram that illustrates an example of the configuration of the information processing device 20 according to the present embodiment. As illustrated in FIG. 6, the information processing device 20 includes a communication unit 210, an operating unit 220, a display unit 230, a storage unit 240, and a control unit 250.

The communication unit 210 communicates with an external device, such as the device management system 10, via the network 2, and it can be implemented by using an NIC, or the like.

The operating unit 220 receives various operation inputs and can be implemented by using an input device, such as a keyboard, a mouse, a touch-pad, or a touch panel.

The display unit 230 displays various screens and can be implemented by using a display device, such as a liquid crystal display or a touch panel display.

The storage unit 240 stores therein various programs that are executed by the information processing device 20 and data that is used during various operations performed by the information processing device 20. The storage unit 240 can be implemented by using at least any one of storage devices, such as an HDD, an SSD, a memory card, an optical disk, a ROM, and a RAM, that enable magnetical, optical, or electrical storage.

The control unit 250 controls each unit of the information processing device 20, and it can be implemented by using a control device, such as a CPU. The control unit 250 includes a second image acquiring unit 251, a number-of-people information acquiring unit 253, a display control unit 255, a control-program acquiring unit 257, and a device control unit 259.

The second image acquiring unit 251 acquires, from the device management system 10, the image associated with the device information.

The number-of-people information acquiring unit 253 acquires the number-of-people information from the device management system 10.

Figure 7:
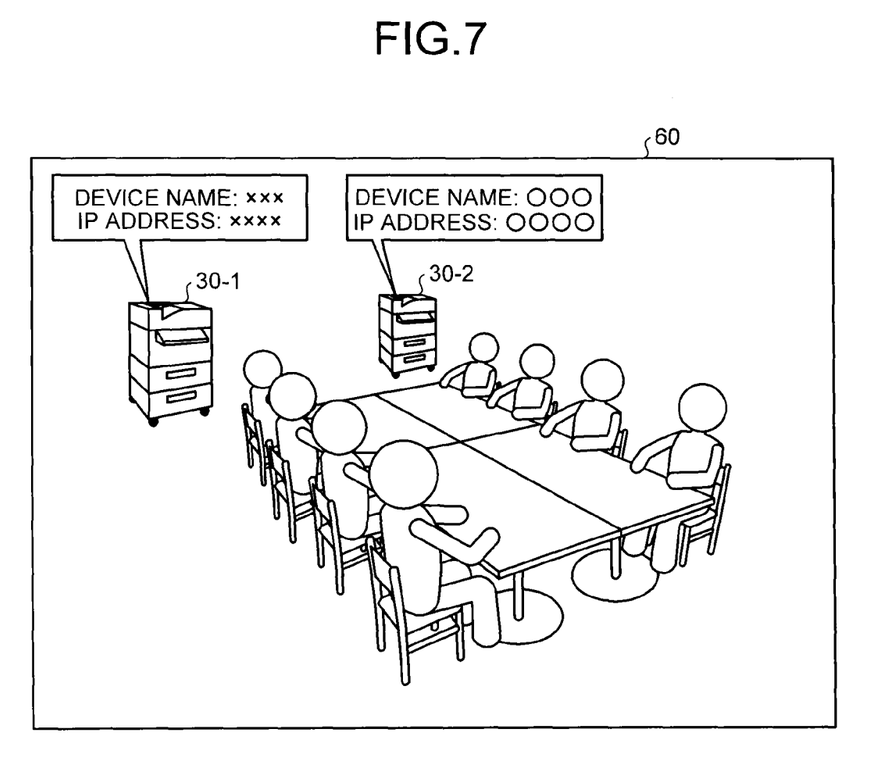
FIG. 7 is a diagram that illustrates an example of an image according to the present embodiment.

The display control unit 255 displays, on the display unit 230, the image that is acquired by the second image acquiring unit 251. FIG. 7 is a diagram that illustrates an example of an image 60 according to the present embodiment. As illustrated in FIG. 7, the image 60 is associated with the device information on the devices 30; therefore, the device name of the device 30-1 and the IP address are displayed in an association manner at the position of the positional coordinates of the device 30-1, and the device name of the device 30-2 and the IP address are displayed in an association manner at the position of the positional coordinates of the device 30-2. Furthermore, the link to the URL of the source from which the printer driver program of the device 30-1 is downloaded is set at the position of the positional coordinates of the device 30-1, and the link to the URL of the source from which the printer driver program of the device 30-2 is downloaded is set at the position of the positional coordinates of the device 30-2.

The control-program acquiring unit 257 acquires the control program of the recognized device 30 via the network 2 on the basis of the acquisition source information included in the device information that is associated with the image acquired by the second image acquiring unit 251.

For example, when a user selects, through the operating unit 220, the device 30-1 on the image 60 displayed on the display unit 230, the control-program acquiring unit 257 accesses the URL of the source from which the printer driver program of the device 30-1 is downloaded, downloads the printer driver program of the device 30-1, and installs it in the information processing device 20.

Furthermore, for example, when a user selects, through the operating unit 220, the device 30-2 on the image 60 displayed on the display unit 230, the control-program acquiring unit 257 accesses the URL of the source from which the printer driver program of the device 30-2 is downloaded, downloads the printer driver program of the device 30-2, and installs it in the information processing device 20.

Here, an explanation is given of, for example, a case where, when the device 30 is selected on the image 60, the download of the printer driver program of the device 30 is automatically started; however, the embodiment is not limited thereto, and it is acceptable that, for example, when the device 30 is selected on the image 60, the transition is made to the download page for the printer driver program of the device 30, and the download is performed in accordance with a user's operation. In this case, the link to the URL of the download page for the printer driver program of the device 30 may be set at the position of the positional coordinates of the device 30.

The device control unit 259 controls the recognized device 30 via the network 2 on the basis of the control program acquired by the control-program acquiring unit 257 and the address information included in the device information that is associated with the image acquired by the second image acquiring unit 251.

For example, when the control-program acquiring unit 257 installs the printer driver program of the device 30, the device control unit 259 serves as a printer driver based on the printer driver program. Furthermore, by using the IP address included in the device information that is associated with the image, the device control unit 259 controls the recognized device 30 so as to perform printing via the network 2.

Specifically, the device control unit 259 generates a print command for printing a print target page and transmits the generated print command to the IP address included in the device information that is associated with the image, thereby controlling the recognized device 30 so as to perform printing via the network 2. The print command includes a print target image or a printing setting. The printing setting includes the number of print copies, or the like, and here the device control unit 259 sets the number of people that is indicated by the number-of-people information, which is acquired by the number-of-people information acquiring unit 253, as the number of print copies in the recognized device 30. Thus, the device control unit 259 controls the recognized device 30 so as to perform printing of the number of copies corresponding to the number of people that is indicated by the number-of-people information acquired by the number-of-people information acquiring unit 253.

Figure 8:
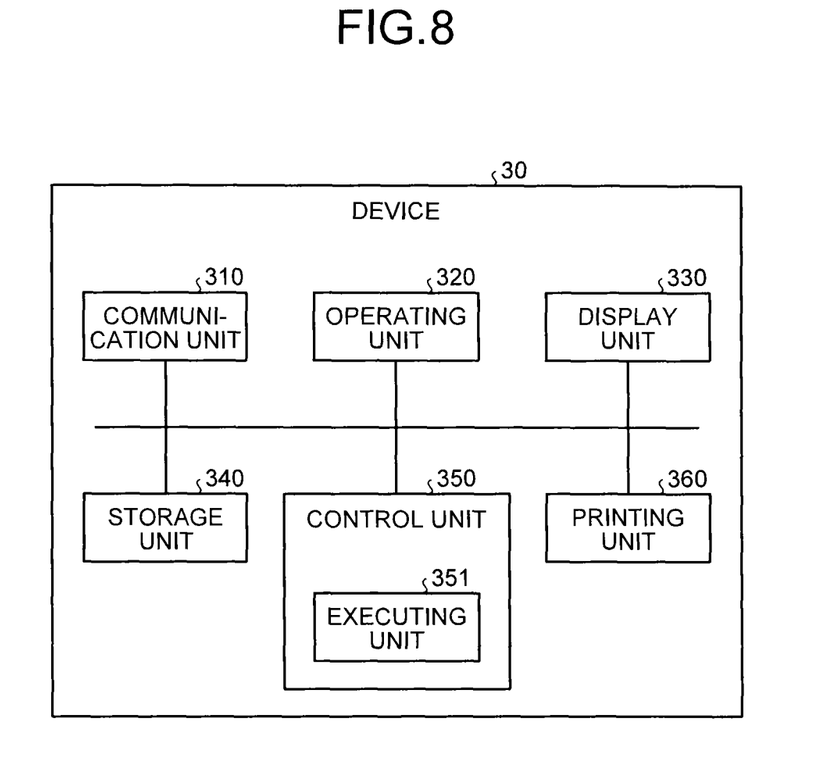
FIG. 8 is a block diagram that illustrates an example of the configuration of a device according to the present embodiment.

FIG. 8 is a block diagram that illustrates an example of the configuration of the device 30 according to the present embodiment. As illustrated in FIG. 8, the device 30 includes a communication unit 310, an operating unit 320, a display unit 330, a storage unit 340, a control unit 350, and a printing unit 360.

The communication unit 310 communicates with an external device, such as the device management system 10 or the information processing device 20, via the network 2, and it can be implemented by using an NIC, or the like.

The operating unit 320 receives various operation inputs and can be implemented by using an input device, such as a keyboard, a mouse, a touch-pad, or a touch panel.

The display unit 330 displays various screens and can be implemented by using a display device, such as a liquid crystal display or a touch panel display.

The storage unit 340 stores therein various programs that are executed by the device 30 and data that is used during various operations performed by the device 30. The storage unit 340 can be implemented by using at least any one of storage devices, such as an HDD, an SSD, a memory card, an optical disk, a ROM, and a RAM, that enable magnetical, optical, or electrical storage.

The control unit 350 controls each unit of the device 30 and can be implemented by using a control device, such as a CPU. The control unit 350 includes an executing unit 351.

The executing unit 351 executes an operation under the control of the information processing device 20. For example, if a print command is transmitted from the information processing device 20, the executing unit 351 causes the printing unit 360 to perform a printing operation based on the print command.

The printing unit 360 performs printing and can be implemented by using, for example, a printer engine.

Figure 9:
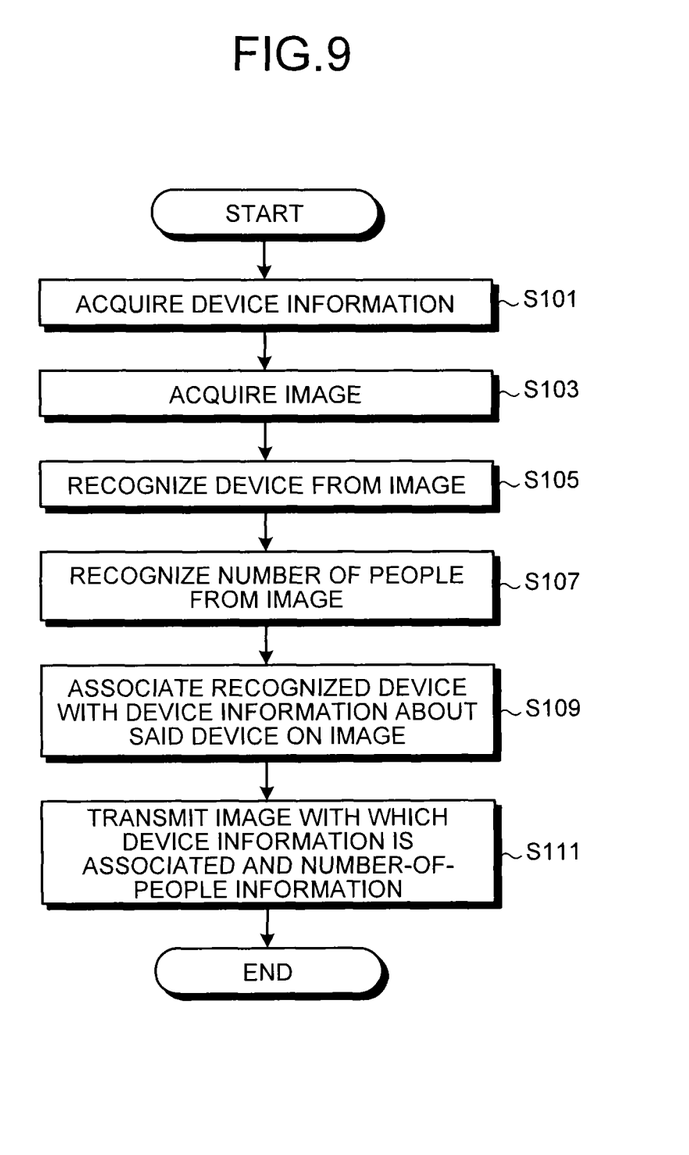
FIG. 9 is a flowchart that illustrates an example of an operation performed by the device management system according to the present embodiment.

FIG. 9 is a flowchart that illustrates an example of an operation performed by the device management system 10 according to the present embodiment.

First, the device-information acquiring unit 151 acquires, from each of the devices 30 that are connected via the network 2, the device information on the device 30 (Step S101).

Next, the first image acquiring unit 153 acquires the image 50 that is obtained by capturing the conference room 5, in which the devices 30-1 and 30-2 are provided, from the capturing device 3 via the access point 4 (Step S103).

Then, the recognizing unit 155 recognizes the devices 30-1 and 30-2 from the image 50 acquired by the first image acquiring unit 153 (Step S105).

Then, the recognizing unit 155 recognizes the number of conference participants who are present in the conference room 5 from the image 50 acquired by the first image acquiring unit 153 (Step S107).

Then, the associating unit 157 associates the device 30-1, which is recognized by the recognizing unit 155, with the device information about the device 30-1 on the image 50 and associates the device 30-2, which is recognized by the recognizing unit 155, with the device information about the device 30-2 on the image 50 (Step S109).

Next, the transmitting unit 159 transmits, to the information processing device 20, the image 60 with which the device information is associated by the associating unit 157 and the number-of-people information that indicates the number of people recognized by the recognizing unit 155 (Step S111).

Figure 10:
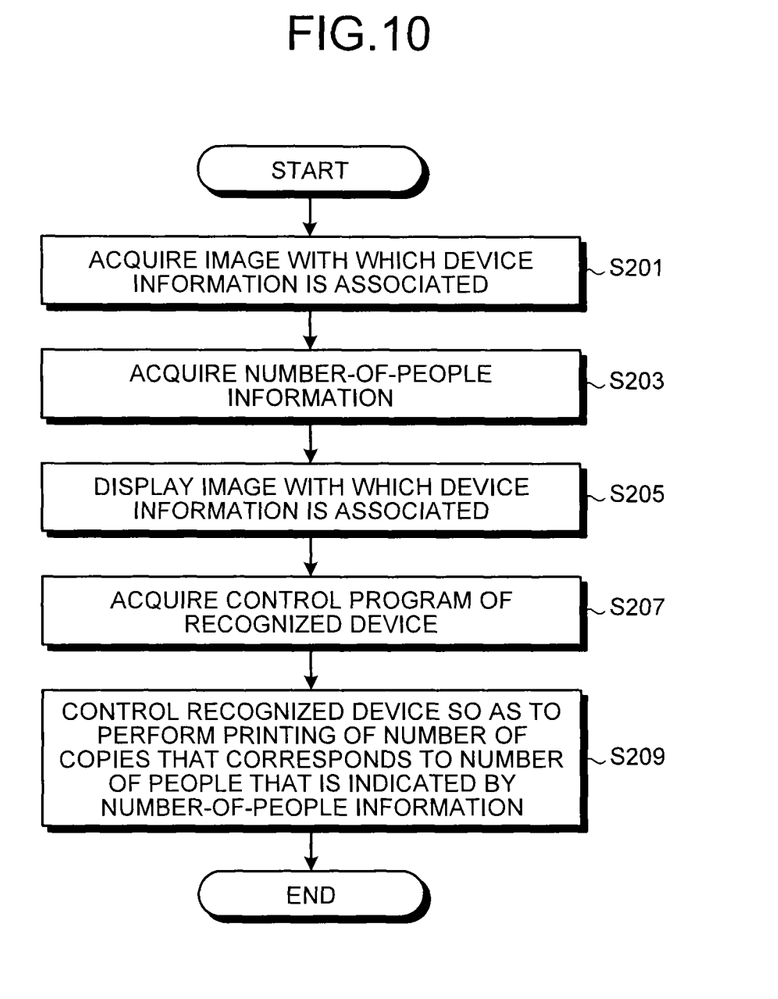
FIG. 10 is a flowchart that illustrates an example of an operation performed by the information processing device according to the present embodiment.

FIG. 10 is a flowchart that illustrates an example of an operation performed by the information processing device 20 according to the present embodiment.

First, the second image acquiring unit 251 acquires, from the device management system 10, the image 60 with which the device information is associated (Step S201).

Next, the number-of-people information acquiring unit 253 acquires the number-of-people information from the device management system 10 (Step S203).

Then, the display control unit 255 displays, on the display unit 230, the image 60 acquired by the second image acquiring unit 251 (Step S205).

Then, when a user selects, through the operating unit 220, the recognized device 30 on the image 60 displayed by the display unit 230, the control-program acquiring unit 257 accesses, via the network 2, the source from which the control program of the recognized device 30 is to be acquired, thereby acquiring the control program of the recognized device 30 (Step S207).

Then, on the basis of the control program, which is acquired by the control-program acquiring unit 257, and the address information included in the device information that is associated with the image, the device control unit 259 controls the recognized device 30 via the network 2 so as to perform printing of the number of copies corresponding to the number of people that is indicated by the number-of-people information acquired by the number-of-people information acquiring unit 253 (Step S209).

As described above, according to the present embodiment, a device is recognized from the image that is obtained by capturing the room, the control program of the recognized device is acquired by using the image with which the device information on the recognized device is associated, and the recognized device is controlled on the basis of the acquired control program. Therefore, even if the location of the device is changed, it is possible to make a user know the information on the device used by the user so as to perform a control on the device.

Furthermore, according to the present embodiment, the number of people present in the room is further recognized by using the image that is obtained by capturing the room, and the recognized device is controlled so as to perform printing of the number of copies corresponding to the number of recognized people. Thus, it is possible to ensure that printing is conducted for the number of people present in the room.

Modification

In the above-described embodiment, an explanation is given of, for example, a case where the download of the control program and printing by the device 30 in the conference room 5 are performed at one time; however, the embodiment is not limited thereto. It is acceptable that the download of the control program is first conducted, and thereafter printing is performed by the device 30 in the conference room 5.

In this case, it is acceptable that the device management system 10 performs the operation illustrated in FIG. 9 on a regular basis and, in downloading the control program, the information processing device 20 acquires the image, which is associated with the device information, from the device management system 10 and performs the operations at Steps S201, S205, and S207 illustrated in FIG. 10 and, in performing printing by the device 30 in the conference room 5, acquires the number-of-people information from the device management system 10 and performs the operations at Steps S203 and S209 illustrated in FIG. 10.

In the above-described embodiment, an explanation is given of, for example, a case where a third person other than the people present in the conference room 5 uses the information processing device 20 to perform printing by using the device 30 in the conference room 5; however, the embodiment is not limited thereto. For example, it is acceptable that a person in the conference room 5 uses a timer function and, when the time set by the timer is reached, printing of the device 30 in the conference room 5 is performed by using the information processing device 20.

Furthermore, in the above-described embodiment, the device management system 10 performs the above-described operation to determine which device(s) 30 is provided in the conference room. Therefore, it is acceptable to store the information obtained by grouping the conference room and the devices 30 provided in the conference room and to output it if needed. In this way, even if the location of the device 30 is changed and it is uncertain where the device 30 has been moved, it is possible to easily find out the place to which the device 30 has been moved.

Furthermore, in the above-described embodiment, an explanation is given of a case where the device management system 10 gives a capturing command to the capturing device 3; however, the embodiment is not limited thereto. For example, a smartphone or a tablet terminal held by a user of the information processing device 20 may give a capturing command to the capturing device 3. In this case, the capturing device 3 may transmit the captured image to the smartphone or the tablet terminal that gives the capturing command so that it is possible to check the image by using the smartphone or the tablet terminal that gives the capturing command.

Hardware Configuration

Figure 11:
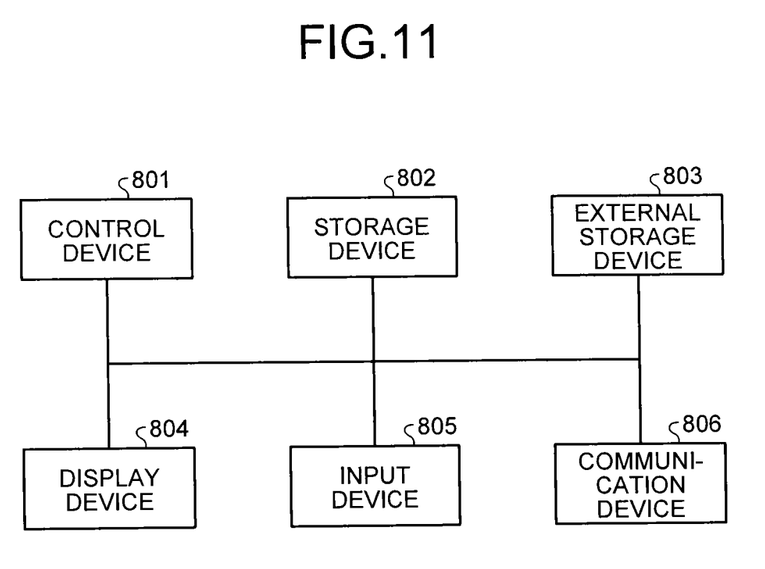
FIG. 11 is a block diagram that illustrates an example of the hardware configuration of each device according to the present embodiment.

FIG. 11 is a block diagram that illustrates an example of the hardware configuration of the device management system 10, the information processing device 20, and the device 30 according to the present embodiment (hereafter, referred to as "each device according to the present embodiment"). Each device according to the present embodiment includes a control device 801 such as a CPU, a storage device 802 such as a ROM or a RAM, an external storage device 803 such as an HDD, a display device 804 such as a display, an input device 805 such as a keyboard or a mouse, and a communication device 806 such as a communication interface, and it includes a hardware configuration that uses a typical computer.

A program to be executed by each device according to the present embodiment is provided by being stored, in the form of a file that is installable and executable, in a storage medium readable by a computer, such as a CD-ROM, a CD-R, a memory card, a digital versatile disk (DVD), or a flexible disk (FD).

Furthermore, the program to be executed by each device according to the present embodiment may be stored in a computer connected via a network, such as the Internet, and provided by being downloaded via the network. Furthermore, the program to be executed by each device according to the present embodiment may be provided or distributed via a network such as the Internet. Moreover, the program to be executed by each device according to the present embodiment may be provided such that it is previously installed in a ROM, or the like.

The program to be executed by each device according to the present embodiment has a modular configuration for implementing the above-described units on a computer. In terms of the actual hardware, the CPU reads a program from the HDD into the RAM and executes it so as to implement the above-described units on the computer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device control system comprising:
a device management system; and
an information processing device, wherein
the device management system includes
circuitry configured to:
acquire, from each of a plurality of devices that are connected to the device management system via a network, device information that includes at least address information indicating an address of a device on the network and acquisition source information indicating a source from which a control program for controlling the device is acquired;
acquire an image by capturing a space where any of the devices are provided;
recognize the device in the image acquired by the circuitry of the device management system; and
associate the recognized device with device information about the recognized device on the image acquired by the circuitry of the device management system, and the information processing device includes
circuitry configured to:
acquire the image with which the device information is associated;
acquire, from the source indicated by the acquisition source information included in the device information that is associated with the image acquired by the circuitry of the information processing device, a control program for controlling the recognized device via the network; and
control the recognized device via the network on a basis of the control program and the address information included in the device information that is associated with the image acquired by the circuitry of the information processing device.

2. The device control system according to claim 1, wherein
the circuitry of the information processing device is further configured to control a display device to display the image acquired by the circuitry of the information processing device, and
when a selection operation is performed to select the recognized device on the displayed image, the circuitry of the information processing device is further configured to acquire the control program of the recognized device via the network on a basis of the acquisition source information included in the device information that is associated with the image acquired by the circuitry of the information processing device.

3. The device control system according to claim 1, wherein
the recognized device includes circuitry configured to execute an operation under a control of the information processing device.

4. The device control system according to claim 1, wherein
the device information further includes device identification information for identifying a device,
each of the devices is provided with code information that is obtained by coding device identification information on the device,
the circuitry of the device management system is configured to extract the code information from the image acquired by the circuitry of the device management system and use device identification information based on the code information to recognize the device from the image acquired by the circuitry of the device management system, and
the circuitry of the device management system is configured to associate, on the image acquired by the circuitry of the device management system, the recognized device with device information that includes device identification information based on the code information out of a plurality of pieces of device information as device information on the recognized device.

5. The device control system according to claim 1, wherein
the devices are image forming devices,
the circuitry of the device management system is further configured to recognize a number of people present in the space from an image acquired by the circuitry of the device management system,
the circuitry of the information processing device is further configured to acquire number-of-people information indicating a number of recognized people, and
the circuitry of the information processing device is further configured to control the recognized device via the network to perform printing of a number of copies that corresponds to the number of people indicated by the number-of-people information on a basis of the control program and the address information included in the device information that is associated with the image acquired by the circuitry of the information processing device.

6. The device control system according to claim 1, wherein the image acquired by the circuitry of the device management system is an image that is captured by a full spherical camera.

7. A device control method implemented by a device control system that includes a device management system and an information processing device, the device control method comprising:
by the device management system,
acquiring, from each of a plurality of devices that are connected to the device management system via a network, device information that includes at least address information indicating an address of a device on the network and acquisition source information indicating a source from which a control program for controlling the device is acquired;
acquiring an image by capturing a space where any of the devices are provided;
recognizing the device in the image acquired at the image acquiring by capturing the space; and
associating the recognized device with device information about the recognized device on the image acquired at the image acquiring by capturing the space, and
by the information processing device,
acquiring the image with which the device information is associated;
acquiring, from the source indicated by the acquisition source information included in the device information that is associated with the image acquired by circuitry of the information processing device, a control program for controlling the recognized device via the network; and
controlling the recognized device via the network on a basis of the control program and the address information included in the device information that is associated with the image acquired at the image acquiring with which the device information is associated.

8. A non-transitory computer-readable medium having computer-readable instructions thereon which when executed by a device control system cause the device control system to perform a device control method comprising:
by a device management system of the device control system,
acquiring, from each of a plurality of devices that are connected to the device management system via a network, device information that includes at least address information indicating an address of a device on the network and acquisition source information indicating a source from which a control program for controlling the device is acquired;
acquiring an image by capturing a space where any of the devices are provided;
recognizing the device in the image acquired at the image acquiring by capturing the space; and
associating the recognized device with device information about the recognized device on the image acquired at the image acquiring by capturing the space, and by an information processing device of the device control system,
- acquiring the image with which the device information is associated;
- acquiring, from the source indicated by the acquisition source information included in the device information that is associated with the image acquired by circuitry of the information processing device, a control program for controlling the recognized device via the network; and
- controlling the recognized device via the network on a basis of the control program and the address information included in the device information that is associated with the image acquired at the image acquiring with which the device information is associated.

* * * * *